United States Patent
Mairesse et al.

(10) Patent No.: US 11,404,257 B2
(45) Date of Patent: Aug. 2, 2022

(54) METHOD AND SYSTEM FOR MEASURING THE CHIRALITY OF MOLECULES

(71) Applicants: CENTRE NATIONAL DE LA RECHERCHE SCIENTIFIQUE, Paris (FR); UNIVERSITE DE BORDEAUX, Bordeaux (FR)

(72) Inventors: Yann Mairesse, Bordeaux (FR); Antoine Comby, Talence (FR)

(73) Assignees: CENTRE NATIONAL DE LA RECHERCHE SCIENTIFIQUE, Paris (FR); UNIVERSITE DE BORDEAUX, Bordeaux (FR)

(*) Notice: Subject to any disclaimer, the term of this patent is extended or adjusted under 35 U.S.C. 154(b) by 42 days.

(21) Appl. No.: 17/252,185

(22) PCT Filed: Jun. 25, 2019

(86) PCT No.: PCT/EP2019/066748
§ 371 (c)(1),
(2) Date: Dec. 14, 2020

(87) PCT Pub. No.: WO2020/002283
PCT Pub. Date: Jan. 2, 2020

(65) Prior Publication Data
US 2021/0257199 A1    Aug. 19, 2021

(30) Foreign Application Priority Data
Jun. 25, 2018    (FR) ........................................ 1855683

(51) Int. Cl.
*H01J 49/00* (2006.01)
*H01J 49/16* (2006.01)
(Continued)

(52) U.S. Cl.
CPC .......... *H01J 49/0031* (2013.01); *G01N 21/31* (2013.01); *G01N 27/628* (2013.01);
(Continued)

(58) Field of Classification Search
CPC .. H01J 49/0031; H01J 49/0004; H01J 49/161; H01J 49/26; H01J 27/24;
(Continued)

(56) References Cited

U.S. PATENT DOCUMENTS

2019/0169210 A1* 6/2019 Lee .................... G01N 23/2202

FOREIGN PATENT DOCUMENTS

WO    2018060120 A1    4/2018

OTHER PUBLICATIONS

Böwering, N., et al., "Asymmetry in Photoelectron Emission from Chiral Molecules Induced by Circularly Polarized Light," Physical Review Letters, 86, No. 7, 2001, pp. 1187-1190.
(Continued)

*Primary Examiner* — Kiet T Nguyen
(74) *Attorney, Agent, or Firm* — Greer, Burns & Crain, Ltd

(57) ABSTRACT

A method for measuring the chirality of molecules in a sample of chiral molecules, the sample including at least one chemical species, the method including the steps of: introducing the sample of chiral molecules into an ionisation area; ionising the molecules by electromagnetic radiation in the ionisation area; and detecting a distribution of electrons produced by ionisation and emitted at the front and back of the ionisation area relative to the axis, z, of propagation of the electromagnetic radiation; wherein the electromagnetic radiation is elliptically polarised, the ellipticity varying continuously and periodically as a function of time, the method further including a step of: determining the chirality of the molecules from the electron distribution detected
(Continued)

continuously as a function of time. A system is also provided for measuring the chirality of molecules using such a method.

21 Claims, 7 Drawing Sheets

(51) Int. Cl.
*H01J 49/26* (2006.01)
*H01J 27/24* (2006.01)
*G01N 27/626* (2021.01)
*G01N 30/70* (2006.01)
*G01N 21/31* (2006.01)

(52) U.S. Cl.
CPC .............. *G01N 30/70* (2013.01); *H01J 27/24* (2013.01); *H01J 49/0004* (2013.01); *H01J 49/161* (2013.01); *H01J 49/26* (2013.01)

(58) Field of Classification Search
CPC .... G01N 21/31; G01N 23/227; G01N 27/628; G01N 30/70
USPC .................................................. 250/281, 282
See application file for complete search history.

(56) References Cited

OTHER PUBLICATIONS

French Search Report Received for French Application No. 1855683 dated Apr. 1, 2019.
International Search Report and Written Opinion Received for PCT/EP2019/066748, dated Jul. 25, 2019.
Janssen, M., et al., "Detecting chirality in molecules by imaging photoelectron in circular dichrosim," Phys Chem Chem Phys, 2014, 16, pp. 856-871.
Lux, C., et al., "Photoelectron Circular Dichroism of Bicyclic Ketones from Multiphoton Ionization with Femtosecond Laser Pulses," ChemPhysChem, 2015, vol. 16, pp. 115-137.

* cited by examiner

METHOD AND SYSTEM FOR MEASURING THE CHIRALITY OF MOLECULES

BACKGROUND

The present invention relates to a method for measuring the chirality of molecules in a sample of chiral molecules, the sample comprising at least one chemical species of chiral molecules. It also relates to a measuring system implementing such a method.

The field of the invention is the field of the chemical analysis of mixtures of chiral molecules.

The analysis of chemical mixtures is an essential tool in a number of industrial processes, both for R&D and for quality control. Chiral molecules, which exist in at least two forms known as enantiomers which cannot be superimposed on their mirror image, are particularly difficult to analyse. These molecules play a crucial role in a number of industrial fields, such as pharmacology, food processing, agrochemicals, etc., where the enantiomeric purity can be of major importance. For example, pharmaceutical compounds can comprise chiral molecules and, since the response of an organism to a molecule can depend on its chirality, it is crucial to know the enantiomeric composition of the molecules of these compounds.

A number of methods have been developed for measuring enantiomeric purity.

A historical technique for analysing molecular chirality is based on circular dichroism (CD). By measuring the absorption difference of a left-hand or right-hand circularly polarized radiation, it is possible to obtain information about the chirality of a sample. However, CD is a very weak effect, which requires dense (liquid) samples and therefore large quantities of material. It provides weak signals, necessitating long acquisition times in order to obtain a good signal-to-noise ratio.

Another recognized technique, based on photoelectron circular dichroism (PECD), consists of ionizing the chiral molecules of a gas sample by means of a circularly polarized radiation. The angular distribution of the electrons ejected by the ionization has a strong asymmetry along the axis of propagation of the light. Thus, more or fewer electrons are emitted towards the front or towards the back depending on the helicity of the light (direction of rotation of the circular polarization) or the enantiomerism of the molecule. This technique can use radiation in the extreme ultraviolet (XUV) range, for ionization with a single photon, or ultraviolet, visible or infrared laser radiation, in which case the ionization is multi-photon ionization. An example is described in document WO2018/060120 A1.

Enantiomeric analysis is more complex in the case of a mixture containing several chemical species. The current techniques using PECD are based on the simultaneous, coincidence, detection of the electrons and ions produced, in order to know which ion originates from each electron. This type of detection requires measuring at most one event per laser pulse in order to produce only one electron and to be able to assign it to its parent ion. Therefore, this considerably limits the speed and precision of this type of measurement.

SUMMARY

A purpose of the present invention is to propose a method and a system for measuring that allow analysis of the chemical and enantiomeric composition of samples in a simple, reliable and fast manner.

Another purpose of the present invention is to propose a method and a system for measuring that allow continuous monitoring or inspection of the composition of a sample of chiral molecules.

Another purpose of the present invention is to propose a method and a system for measuring that allow continuous monitoring or inspection of the relative proportion of species in a multi-species sample and for determining the enantiomeric excess of each species.

A purpose of the present invention is also to propose a method and a system for measuring that do not require any preparation of the samples and only require a low consumption of the sample.

Finally, a purpose of the present invention is to propose a method and a system for measuring that do not require any detection of ions.

At least one of these objectives is achieved with a method for measuring the chirality of molecules in a sample of chiral molecules, the sample comprising at least one chemical species, wherein the method comprises the following steps:

introducing the sample of chiral molecules into an ionization area;

ionizing the molecules by means of an electromagnetic radiation in the ionization area;

detecting a distribution of electrons produced by the ionization and emitted to the front and to the back of the ionization area with respect to the axis, z, of propagation of the electromagnetic radiation; and determining the chirality of the molecules from the electron distribution detected continuously as a function of time.

The electromagnetic radiation is elliptically polarized, wherein the polarization ellipticity of the radiation varies continuously and periodically as a function of time.

Within the framework of the present invention, the term "electron distribution" can mean, simultaneously:

a number of electrons, obtained by simple counting,
a spatial distribution of electrons, or
an angular distribution of electrons, wherein the electrons are emitted towards the front and towards the back of the ionization area with respect to the axis of propagation of the ionizing radiation.

Thus, within the framework of the present invention, the chirality of the molecules of the sample can be determined from the number of electrons emitted forward and the number of electrons emitted backward.

The technique proposed by the method according to the invention is based on elliptical dichroism of the electrons, or photoelectrons, measured continuously. Thus, the evolution of the distribution of the electrons emitted forward and backward, and therefore its asymmetry, is measured as a function of time and as a function of the polarization state of the electromagnetic radiation. By making the ellipticity of the polarization of the radiation vary continuously and periodically as a function of time, the polarization oscillates continuously and periodically between left-hand circular-left-hand elliptical-linear-right-hand elliptical-right-hand circular polarizations. The continuous measurement of a periodic signal then makes it possible to carry out simpler and faster analyses of the sample of molecules.

Advantageously, the step of determining the chirality can be performed in real time.

According to a particularly advantageous embodiment, the detection step can be carried out through measurements of the number of electrons, emitted to the front and to the back of the ionization area with respect to the axis z of propagation of the electromagnetic radiation, at times $t_i$ (i=1, 2, etc.), wherein the measured number is integrated during an interval $\Delta t = (t_i - t_{i-1})$ for each measurement.

Thus, the whole measurement time is useful for sampling the signal correctly, without time being lost.

According to a non-limitative embodiment example, the step of determining the chirality of the molecules can comprise a step of comparing a number of electrons detected at the front and a number of electrons detected at the back of the ionization area with respect to the axis z of propagation of the electromagnetic radiation.

Advantageously, the method according to the invention can moreover comprise a step of Fourier analysis of a temporal evolution of the electron distribution in order to obtain the frequency spectrum of the distribution.

Indeed, by modulating the polarization state of the ionizing radiation periodically, the signal detected in the form of electron distribution also has a periodicity. This periodicity makes simple analyses of the signal possible, and in particular a Fourier analysis step, consisting of performing a Fourier transform. The Fourier transform makes it possible, via the frequency spectrum of the temporal evolution of the electron distribution, to access other properties of the sample of molecules, such as an enantiomeric excess and its temporal evolution.

Thus, taking into account a sample of single-species molecules, the method according to the invention can moreover comprise a step of determining the enantiomeric excess from the frequency spectrum of the electron distribution.

Advantageously, the Fourier transform can also be carried out over successive time slices of the electron distribution. It is then possible to monitor the temporal evolution of the enantiomeric excess.

Alternatively, the temporal evolution of the electron distribution can be obtained directly from an analysis of an electronic signal, for example using a set of electronic filters making it possible to measure the different components of the Fourier transform, or using an electronic spectrum analyser.

According to an embodiment, the method according to the invention can moreover comprise a step of generating a spatial and/or angular distribution map of the electrons from the distribution of the electrons as a function of time.

According to an example, the distribution map can be a velocity map of the electrons.

This map is constituted by the number of electrons landing on a detector. The position on the detector reflects the velocity that the electrons had during the ionization as well as their emission direction. Each species of chiral molecules has a specific velocity map.

Advantageously, the method according to the invention can moreover comprise a step of Fourier analysis of each component of the distribution map.

Alternatively or additionally, the method according to the invention can moreover comprise the following steps:
  determining the projection of the distribution map onto the axis of propagation of the electromagnetic radiation; and
  Fourier analysis of the temporal evolution of the projection in order to obtain the frequency spectrum.

According to a variant, the projection of the distribution map can be measured directly with a suitable one-dimensional detector.

Advantageously, for a sample of multi-species molecules, the method can moreover comprise a step of determining the species of the sample from the frequency spectrum of the projection of the distribution map.

According to an embodiment, the method according to the invention can moreover comprise a step of determining the enantiomeric excess from the frequency spectrum of the projection of the distribution map.

Advantageously, in addition to the modulation of the polarization, other parameters of the electromagnetic radiation can be temporally modulated, for example the energy (or intensity), wavelength or laser pulse duration. The temporal evolution of the electron distribution is then different from, or enhanced compared with, a distribution for which only the ellipticity of the polarization has been modulated. In the Fourier spectrum of such an enhanced electron distribution, the number of components, or peaks, present is increased compared with a distribution where only the ellipticity of the polarization has been modulated. The largest number of components then makes finer analyses of the chemical and enantiomeric composition of samples of multi-species molecules possible, as well as the monitoring thereof in real time.

According to another aspect of the same invention, a system for measuring chirality is proposed, comprising:
  an ionization area arranged in order to receive a sample of chiral molecules comprising at least one chemical species;
  an electromagnetic radiation source arranged in order to emit an electromagnetic radiation and to ionize the chiral molecules in the ionization area by means of the electromagnetic radiation;
  electron detection means arranged in order to detect a distribution of electrons produced by the ionization and emitted to the front and to the back of the ionization area with respect to the axis, z, of propagation of the electromagnetic radiation;
  a polarization modulator arranged in order to polarize the electromagnetic radiation elliptically and arranged in order to make the polarization ellipticity of the radiation vary continuously and periodically as a function of time; and
  a determination device arranged and/or programmed in order to determine the chirality of the molecules from the electron distribution detected continuously as a function of time.

According to non-limitative examples, the electron detection means can comprise at least one of a magnetic field ejection asymmetry detector and a velocity map imaging spectrometer.

Particularly advantageously, the electromagnetic radiation source can be a laser source.

Preferably, the laser source is a pulsed laser source producing femtosecond pulses.

According to a non-limitative example, the wavelength of the pulsed laser source can be in the range from ultraviolet to visible.

According to an advantageous variant, the pulsed laser source can be a high-speed fibre laser.

Such laser sources are commercially available and easy to use with the system according to the invention.

In general, the wavelength of the electromagnetic radiation source determines the type of ionization of the molecules, either single-photon ionization or multi-photon ionization.

Indeed, pulsed laser sources having wavelengths in the visible, infrared or ultraviolet range produce radiation capable of causing multi-photon ionization. In contrast, far-ultraviolet or extreme ultraviolet light sources can induce single-photon ionization, whether they are continuous or pulsed.

According to an embodiment, the system according to the invention can moreover comprise a pulse-duration modulator for the laser source.

According to an embodiment, the system according to the invention can moreover comprise an ion detector arranged in order to detect the ionized molecules.

The ion detector can, for example, be a mass spectrometer.

Even if the ion detector is not essential for the implementation of the method according to the present invention, it can nevertheless be useful for monitoring the temporal evolution of the chemical composition of the sample and providing an additional precision to the enantiomeric analysis of multi-species mixtures according to the present invention.

Advantageously, the polarization modulator can comprise a quarter-wave plate arranged in order to be set in rotation about the axis of propagation of the radiation.

Such a modulator is particularly simple to use, space-saving and economical. Commercially available motorized rotation devices can be used with the quarter-wave plate.

It is also possible to use other types of polarization modulators, such as electro-optic elements (Pockels cell, etc.).

According to a variant, the ellipticity of the polarization can be modulated by interferometric control of the two polarization components.

Advantageously, the system according to the invention can moreover comprise an intensity modulator for the electromagnetic radiation and/or a wavelength modulator for the electromagnetic radiation.

Typically, the determination device comprises at least one computer, a central processing or calculation unit, an analogue electronic circuit (preferably dedicated), a digital electronic circuit (preferably dedicated), and/or a microprocessor (preferably dedicated), and/or software means.

Advantageously, the system according to the invention is arranged in order to implement the method according to the invention.

According to an embodiment, the determination device is arranged and/or programmed in order to determine the chirality in real time.

According to an example, the detection means are arranged in order to carry out measurements of the number of electrons, emitted to the front and to the back of the ionization area with respect to the axis of propagation of the electromagnetic radiation, at times $t_i$ (i=1, 2, etc.), wherein the determination device is arranged and/or programmed in order to integrate the number measured during an interval $\Delta t = (t_i - t_{i-1})$ for each measurement.

According to an embodiment, the determination device is arranged and/or programmed in order to compare a number of electrons detected at the front and a number of electrons detected at the back of the ionization area with respect to the axis of propagation of the electromagnetic radiation, wherein the detection means are arranged in order to detect the numbers of electrons.

Advantageously, the determination device is arranged and/or programmed in order to perform a Fourier analysis of a temporal evolution of the electron distribution in order to obtain the frequency spectrum of the distribution.

According to an example, for a sample of single-species molecules, the determination device is arranged and/or programmed in order to determine an enantiomeric excess from the frequency spectrum of the electron distribution.

According to an embodiment, the determination device is arranged and/or programmed in order to generate a spatial and/or angular distribution map of the electrons from the distribution of the electrons as a function of time.

According to a variant, the determination device is arranged and/or programmed in order to perform a Fourier analysis of each component of the distribution map.

According to an embodiment, the determination device is arranged and/or programmed in order to:
determine the projection of the distribution onto the axis of propagation of the electromagnetic radiation; and
perform a Fourier analysis of the temporal evolution of the projection in order to obtain the frequency spectrum.

According to an example, for a sample of multi-species molecules, the determination device is arranged and/or programmed in order to determine the species of the sample from the frequency spectrum of the projection of the distribution map.

According to another example, the determination device is arranged and/or programmed in order to determine the enantiomeric excess from the frequency spectrum of the projection of the distribution map.

The method and the system according to the invention can each be used for measuring the chirality of molecules in the field of pharmacology, food processing or also pesticides. In fact, these industries, among others, need reliable and fast chiral analysis techniques, in particular in the development phases for new compounds, in order to identify, for example, the reaction products and their enantiomeric excesses.

According to a first application example, it can be very useful to monitor, in real time, the composition of a mixture in which a chemical reaction is taking place. This reaction monitoring can be performed directly with the method and the system according to the invention, in particular by collecting the vapours emitted by the vessel in which the reaction is taking place.

According to a second application example, it can be very useful to undertake chiral analysis measurements in series, in particular during the synthesis of multiple products with very similar structures in the research and development phase, where the factors of reliability and speed are very important. For example, on a base molecule, different functional groups can be substituted in order to converge towards a compound that has optimal sought properties. In this specialized field, the intermediate compounds to be measured are often generated in small quantities, a requirement which the method and the system according to the present invention propose to meet.

According to a third application example, the chiral analysis is carried out during quality control and in particular at the end of production. Ideally, sampling, very regularly, or even continuously, very small amounts of products to be analysed with a real-time analysis makes it possible to quantify the enantiomeric excess and its evolution over time.

More generally, the method and the system for measuring according to the invention can each be used for analysing the enantiomeric purity of a sample of chiral molecules.

BRIEF DESCRIPTION OF THE DRAWINGS

Other advantages and characteristics will become apparent on examination of the detailed description of examples that are in no way limitative, and from the attached drawings, in which.

DETAILED DESCRIPTION

It is well understood that the embodiments that will be described hereinafter are in no way limitative. Variants of the invention can in particular be envisaged comprising only a selection of characteristics described hereinafter in isolation from the other characteristics described, if this selection of characteristics is sufficient to confer a technical advantage or to differentiate the invention with respect to the state of the prior art. This selection comprises at least one, preferably functional, characteristic without structural detail, or with only a part of the structural details if this part alone is sufficient to confer a technical advantage or to differentiate the invention with respect to the state of the prior art.

In particular, all the variants and all the embodiments described can be combined together if there is no objection to this combination from a technical point of view.

In the figures, elements common to several figures keep the same reference.

Figure 1:
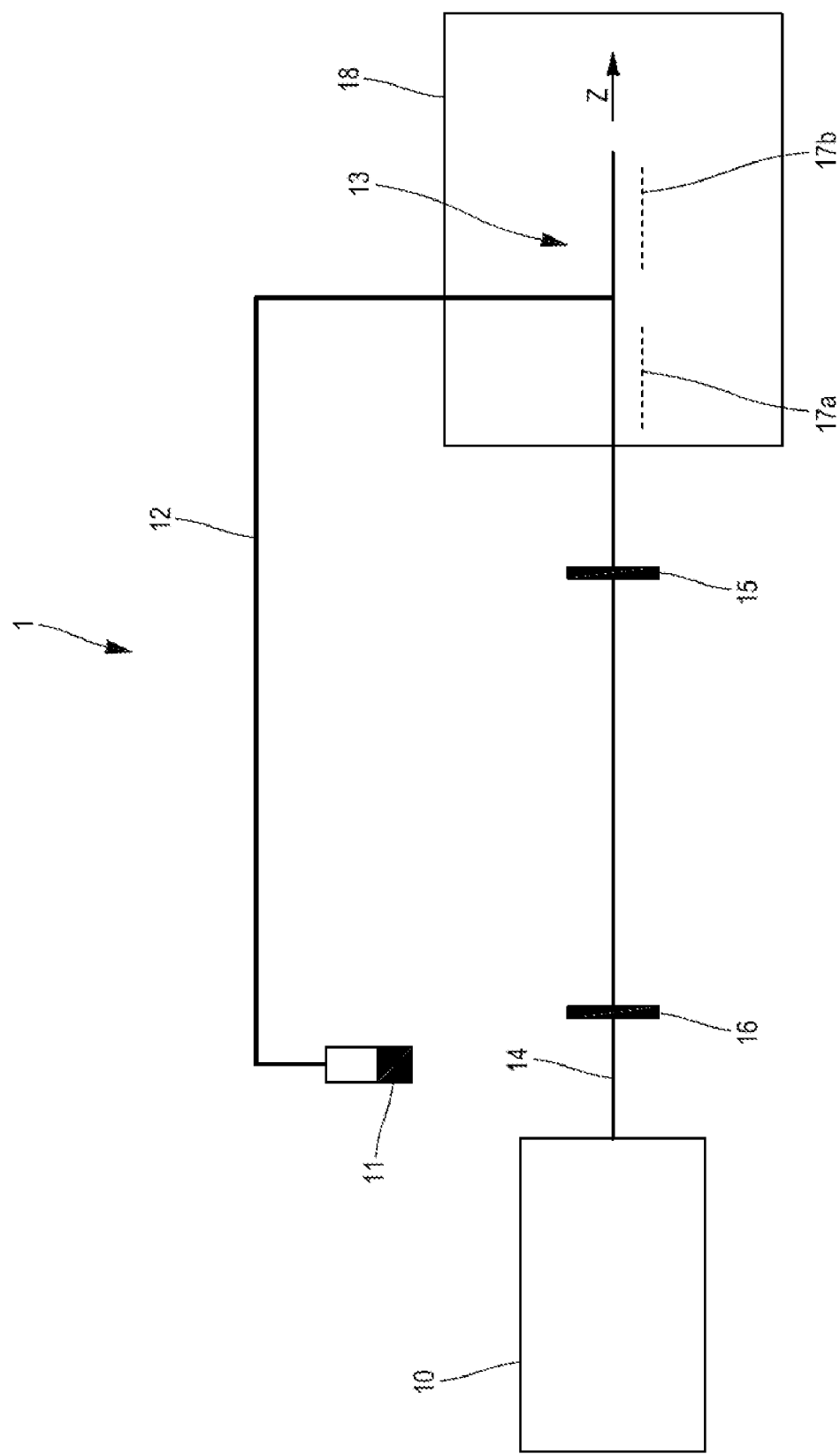
FIG. 1 is a diagrammatic representation of a non-limitative embodiment example of a device according to the invention.

FIG. 1 is a diagrammatic representation of a non-limitative embodiment example of a system for measuring according to the invention.

System 1, represented in FIG. 1, comprises an electromagnetic radiation source 10, for example a pulsed laser.

Preferably, this laser source 10 is a pulsed fibre laser emitting in the infrared range (for example, at 1030 nm), optionally combined with non-linear crystals, for example a doubling crystal, in order to produce radiation around 515 nm. The pulses emitted are femtosecond pulses, with a speed of approximately 2 million pulses per second. The energy per pulse is of the order of a few µJ. With such a laser source, the ionization of molecules is a resonant multi-photon ionization.

There are different types of femtosecond laser sources that can be used within the framework of the invention, which are well known to a person skilled in the art and will not be detailed here.

The system 1 moreover comprises a vessel 11 of molecules. The mixture of molecules in the vessel 11 can be single-species or multi-species. The mixture can be present in solid, liquid or gaseous form. The vessel 11 can be, for example, a flask.

A sample of molecules is transported, in gaseous form, through a gas pipe 12 towards an ionization area 13. In order to obtain the gaseous form when the mixture in the vessel 11 is solid or liquid, the vessel can, for example, be heated.

The ionization area 13 is generally implemented by a vacuum chamber 18, into which the gas is introduced.

The light beam 14 emitted by the laser 10 is directed towards and focused into the ionization area 13 with the aid of known beam-shaping means, such as mirrors and lenses, represented by the reference 15 in FIG. 1.

The system 1 according to the invention moreover comprises a polarization modulator 16. The polarization modulator 16 is arranged in order to polarize the laser radiation 14 elliptically and in order to vary the ellipticity of the polarization continuously as a function of time.

Figure 2A:
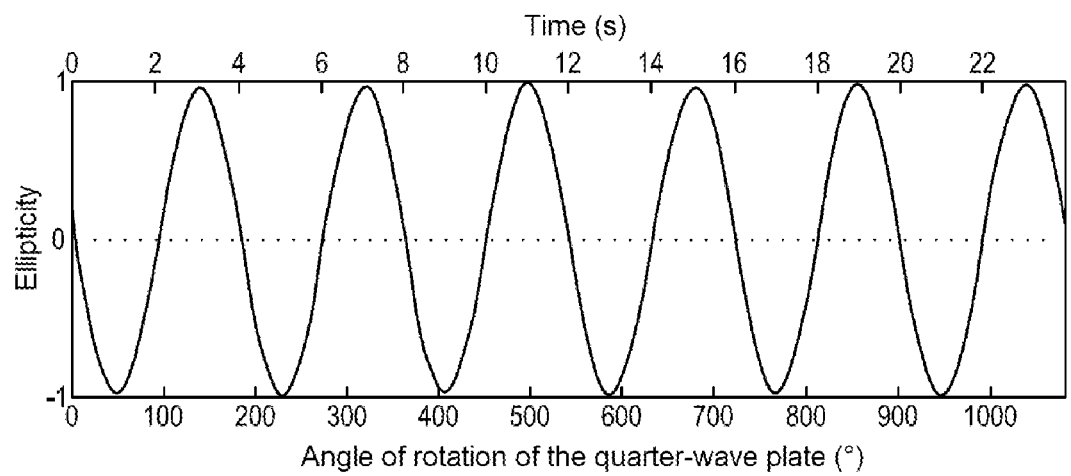
FIG. 2A is a diagrammatic representation of the polarization of the laser radiation of a device according to the invention.

According to an advantageous embodiment, the polarization modulator is a quarter-wave plate 16 set in rotation about the axis z of propagation of the laser radiation. When a linearly polarized beam passes through the quarter-wave plate 16, its polarization resulting after the plate 16 is linear, circular or elliptical, left-hand or right-hand, as a function of the orientation of the fast and slow axes of the plate with respect to the incident linear polarization. When the quarter-wave plate 16 is set in rotation continuously about the axis z of propagation (corresponding to the main axis of the plate 16), the ellipticity of the resultant polarization varies as a function of time between left-hand circular-left-hand elliptical-linear-right-hand elliptical-right-hand circular. FIG. 2A shows an example of the temporal evolution of the ellipticity of the polarization for a quarter-wave plate turning 45° per second. This evolution has a sinusoidal shape.

The rotation of the quarter-wave plate can be performed by any means known to a person skilled in the art, in particular with the aid of a motorized plate support.

According to an embodiment example, the system 1 according to the invention can also comprise an intensity modulator (or energy modulator, not shown) for the laser beam. This modulator can be, for example, an attenuator constituted by a half-wave plate and a fixed polarizer. The continuous rotation of the half-wave plate makes a periodic modulation of the energy of the laser possible. The frequency of the modulation of the intensity can be lower than that of the modulation of the ellipticity of the polarization. For example, the ellipticity-modulation period can be 1 second, and the intensity-modulation period can be 20 seconds.

According to another embodiment example, the system 1 according to the invention can also comprise a modulator for the laser pulse duration (not shown). For example, in the case of a frequency-drift amplification laser comprising a grating compressor, the modulation can be performed by varying the distance between the gratings of the compressor with the aid of a mechanical translation means.

According to yet another embodiment example, the system 1 according to the invention can comprise a wavelength modulator for the electromagnetic radiation source. In the case of a pulsed laser source, it is possible for example to modulate the wavelength finely by varying the orientation of a doubling crystal, or strongly by using a frequency-conversion device of the optical parametric amplifier type.

When the laser radiation interacts with the molecules present in the ionization area, the molecules are ionized, ejecting electrons. Preferably, at least one molecule is ionized per laser pulse. The electrons are emitted in different directions. Owing to the chirality of the molecules, the angular and/or spatial distribution of the emitted electrons is asymmetric, which means that more electrons are emitted forward than backward, or more electrons are emitted backward than forward. This asymmetry is present for the circular and elliptical polarizations of the laser. When the polarization of the radiation is linear, the asymmetry disappears.

Still with reference to FIG. 1, the system 1 according to the invention moreover comprises electron detection means arranged in order to detect the electrons, or photoelectrons, produced by the ionization of the molecules and emitted to the front and to the back of the ionization area 13 with respect to the axis z of propagation of the light. In the embodiment example represented, these detection means are represented by plates 17a, 17b positioned at the front and at the back of the ionization area 13.

Electron detection means include, for example, a velocity map imaging (VMI) spectrometer for the electrons. Such a VMI spectrometer images and converts the electron angular and/or spatial distribution into an optical signal, which can be measured by a camera.

Other electron detectors are, for example, detectors that directly measure the number of electrons emitted towards the front and towards the back by guiding them using a magnetic field onto two detectors.

The system 1 according to the invention also comprises a determination device (not shown), such as a computer. This device is in particular arranged in order to carry out the determination of the chirality of the molecules from the electron spatial or angular distribution detected continuously as a function of time. Other analysis operations can be carried out by this device, as will be detailed below.

Embodiment examples of a method for measuring according to the invention will be described in the following with reference to FIGS. 1 to 5, implemented by the system according to the embodiment described above.

A gaseous sample of molecules is introduced into the ionization area 13. The sample can contain molecules of a single or of several chemical species. The molecules are ionized in the ionization area 13 by means of the laser radiation 14, by resonant multi-photon ionization. The laser beam 14 is polarized elliptically by the quarter-wave plate 16 turning so that the ellipticity varies continuously as a function of time. FIG. 2A shows the temporal evolution of the ellipticity of the polarization for the quarter-wave plate turning 45°/s.

The photoelectrons emitted by means of the ionization are detected, in particular the number and/or angular or spatial distribution thereof towards the front and towards the back of the ionization area with respect to the axis z of propagation. This makes it possible in particular to measure the forward-backward asymmetry of the photoelectron distribution as a function of the polarization ellipticity of the radiation. The angular distribution can, for example, be measured with a VMI spectrometer.

The evolution of the signal measured has a periodicity: the signal is the same at each half-turn of the quarter-wave plate, in line with the polarization ellipticity, which is also the same at each half-turn of the plate (see FIG. 2A). This periodicity makes a simple analysis of the signal possible, for example by Fourier transform. The signal is measured "on the fly", i.e. it is averaged over an exposure time $\Delta t$ and is measured without dead time every $\Delta t$. The exposure time $\Delta t$ is chosen so as to obtain a good signal level. The rotational speed of the quarter-wave plate 16 must therefore be adjusted in order to correctly sample the oscillations of the signal. According to an example, for the plate turning at 45°/s, the exposure time $\Delta t = 50$ ms. Of course, other exposure times and other rotational speeds of the plate can be chosen.

In order to be able to determine the chirality of the molecules of the sample, the number of electrons emitted towards the front F is compared with the number of electrons emitted towards the back B, as a function of time. An asymmetry function G(t) defined as follows is obtained: $G=4(F-B)/(F+B)$. The evolution of this function G(t) as a function of the rotation of the quarter-wave plate (represented in FIG. 2A) is presented in FIG. 2B.

Figure 2B:
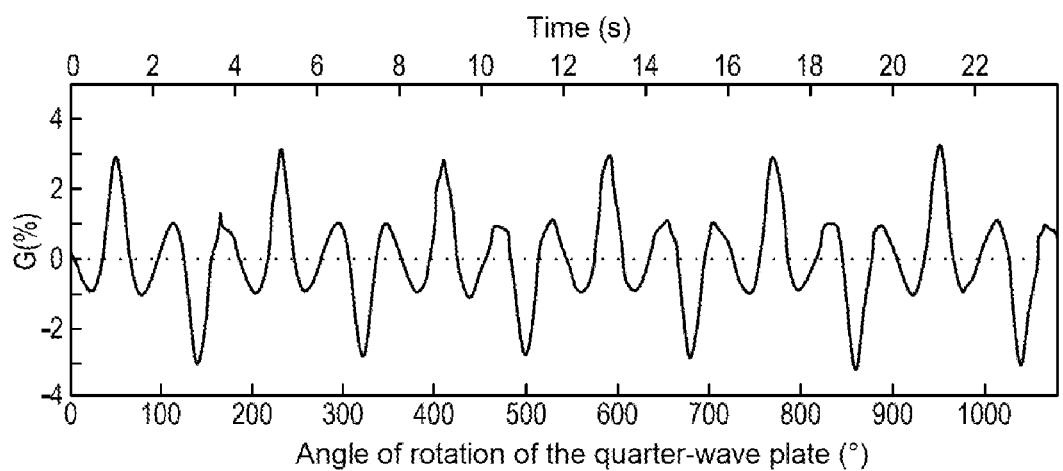
FIGS. 2B and 2C are diagrammatic representations of a non-limitative example of analysis of a sample of chiral molecules with the device or the method according to the present invention.

It is observed, in FIG. 2B, that the asymmetry G(t) has a complex and non-sinusoidal temporal structure. This means that the evolution of the forward-backward asymmetry is not monotonic with the polarization ellipticity of the laser, but can even change sign. This effect is due to the resonant nature of the multi-photon ionization by the laser.

The Fourier analysis of the asymmetry function G(t) consists of decomposing the function by Fourier transform, making it possible to obtain its spectrum as a function of the oscillation frequency. The frequency spectrum of the function G of FIG. 2B is presented in FIG. 2C. This frequency spectrum shows a series of peaks 31 to 34 reflecting the non-linearity of the response, i.e. of the temporal evolution of the asymmetry in the electron distribution, to the ellipticity of the laser.

The decomposition by Fourier transform can be used in several ways. These possibilities are summarized in FIG. 3.

From the spatial (or angular) distribution 20 of the electrons, the enantiomeric excess 21 of a mono-species sample can be accessed directly. It is also possible to generate a velocity map 22 as indicated above. The velocity map 22 can then be analysed in at least two ways. Firstly, the projection 23 onto the axis z of propagation makes it possible to determine the chemical composition 24 as well as the enantiomeric excess 25 of a multi-species sample (analysis in one dimension). Secondly, the chemical composition 24 as well as the enantiomeric excess 25 of a multi-species sample can be determined directly from the velocity map 22 without passing through the projection 23 (analysis in two dimensions, represented by the dotted arrows).

The different measurement and analysis examples will be detailed in the following.

Direct Measurement of the Enantiomeric Excess of a Single-Specie Sample

Figure 2C:
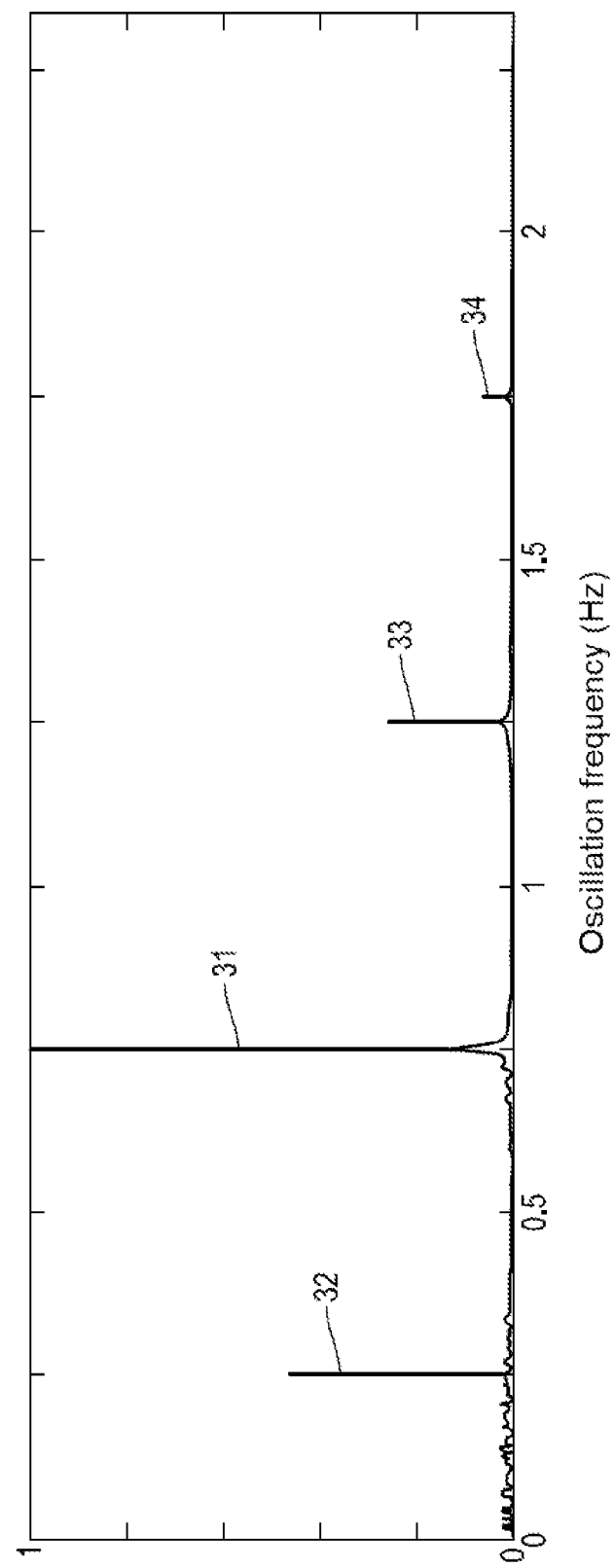
Figure 3:
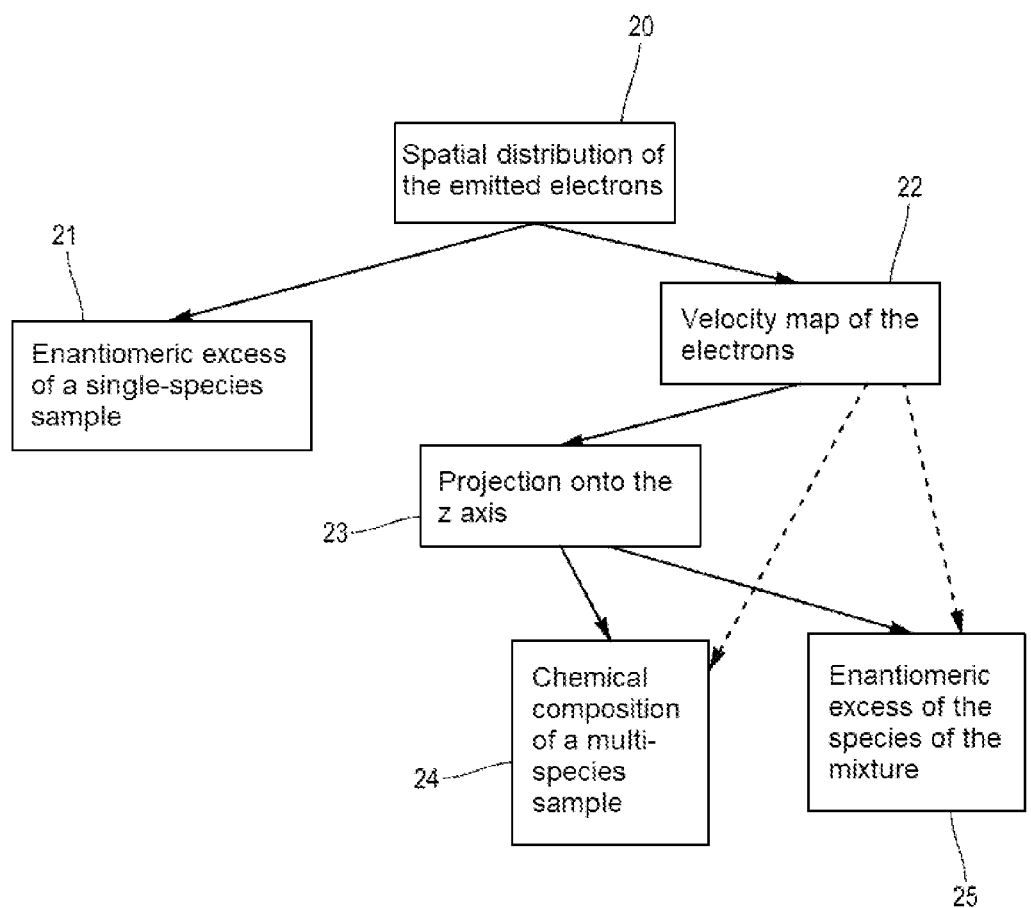
FIG. 3 represents a diagram of embodiments of the method according to the present invention.

With reference to FIG. 2C, the amplitude of the main peak 31 $I_{peak}$ of the Fourier transform makes the direct measurement of the enantiomeric excess of a single-species sample possible, after calibration using an enantiomerically pure compound, of which the main peak of the Fourier transform has the amplitude $I_{peak}^{ref}$. The enantiomeric excess ee is defined as follows:

$$ee=([R]-[S])/([R]+[S]),$$

where [R] and [S] are the concentrations of the two enantiomers present in the sample. It is provided directly by the Fourier transform analysis:

$$ee=I_{peak}/I_{peak}^{ref}.$$

Thus, using a high-speed laser source, such as a femtosecond fibre laser, it is possible to carry out a precise measurement of the enantiomeric excess very rapidly.

Figure 4:
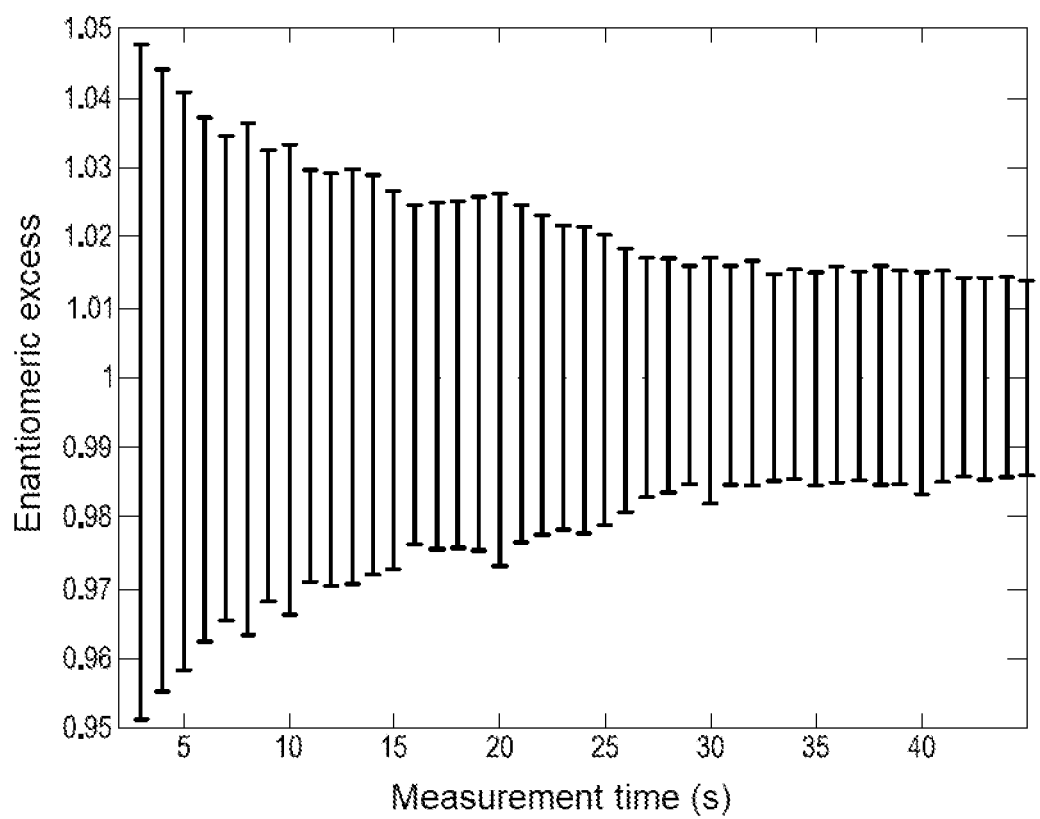
FIG. 4 is a measurement example of the enantiomeric excess according to an embodiment of the method of the present invention.

FIG. 4 presents the precision of the ee measurement (confidence interval at 95%) as a function of the duration of the measurement. It is observed that a precision of the order of 5% is achieved in approximately 3 seconds of measurement. It is possible to achieve a better precision by repeating the measurements, i.e. by carrying out a longer acquisition and cutting the signal to be analysed into successive slices of 3 seconds. This is the principle of a Gabor analysis of the signal, which consists of local Fourier transforms in analysis time windows. All of these Fourier transforms localized in this way form the Gabor transform of the signal, which then provides a local frequency spectrum.

A statistical analysis of 120 measurements of 5 seconds (i.e. 10 minutes of total acquisition) is summarized in Table 1 below. This statistical analysis gives a precision of 0.4% (right-hand column). Table 1 presents the characterization of several enantiomeric mixtures using the technique according to the present invention, in comparison with the data provided by the manufacturer of the mixtures. The comparison demonstrates a very good agreement between the theoretical projections of the manufacturer and the results obtained with the method of the invention. This precision is achieved owing to the continuous variation of the polarization ellipticity of the laser radiation and the acquisition on the fly. As indicated above, all of the measurement time is useful for sampling the oscillation of the signal of the distribution of the electrons. The Fourier analysis filters out the noise by reproducing only the oscillating part of the signal.

TABLE 1

| Mixture | Manufacturer's enantiomeric excess | Measured enantiomeric excess |
|---|---|---|
| 1 | −84.2 ± 4% | 84.0 ± 0.4% |
| 2 | 63.1 ± 4% | 62.7 ± 0.5% |
| 3 | 25.1 ± 4% | 24.9 ± 0.4% |

Real-Time Monitoring of the Enantiomeric Composition of a Single-Specie Sample

The possibility of carrying out the fast and precise determination of the enantiomeric excess makes it possible to carry out the real-time monitoring of the enantiomeric composition of a sample. For this, the measured signal is cut into time slices and a Fourier analysis is performed on each slice (representing a Gabor analysis). The duration of each slice determines the precision of each measurement and the temporal resolution of the monitoring.

Figure 5:
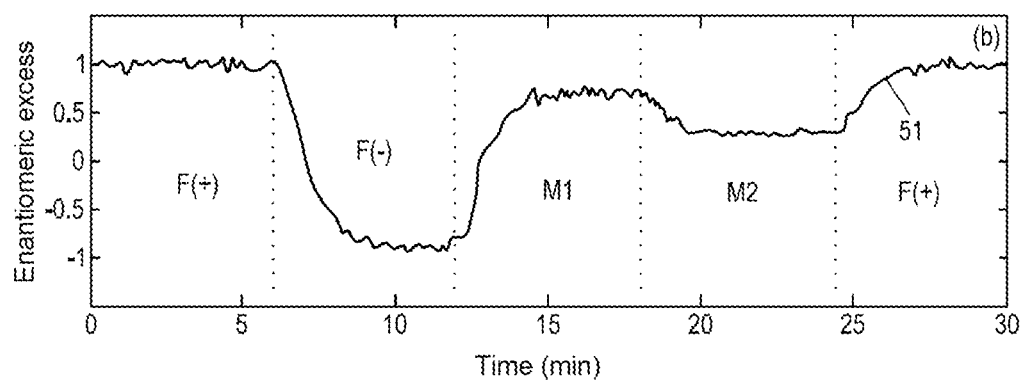
FIG. 5 is a diagrammatic representation of a non-limitative example of analysis of single-species samples with the present invention.

FIG. 5 presents the results obtained by this method for samples of fenchone comprising molecules of two opposing chiralities (+) and (−). The measured enantiomeric excess 51 is presented there for enantiomerically pure samples of fenchone F(+), F(−) or mixtures M1, M2 thereof, as a function of time. The passage from one sample to the other is performed by closing and opening corresponding flasks containing the different heated liquid compounds. The passage from one sample to the other takes several minutes because of the path to be followed by the sample between the flasks and the ionization area. The measurement makes it possible to monitor the enantiomeric composition of a sample in real time, with high precision.

Measurement of Enantiomeric Excess in a Multi-Species Sample

The evolution of the asymmetric signal G(t) as a function of the polarization ellipticity depends on the chemical species considered. From the point of view of the Fourier analysis (see the example of FIG. 2C), this means that the amplitudes and the phases of the different peaks of the frequency spectrum are characteristic of the ionized molecular species, and can then be used in order to carry out an enantiomeric analysis of a mixture of several chemical species. In order to characterize a multi-species mixture completely, it is also necessary to know the relative weight of the different species in the measured signal and the enantiomeric excess of each species.

In order to know the relative contribution of the different species, it is possible to make use of the fact that the resonant ionization of different molecular species produces photoelectrons with different velocity distributions. By measuring the evolution of the velocity map (for example with the VMI spectrometer) as a function of the polarization ellipticity of the laser radiation, a different signature is obtained for different ionized molecular species. In order to simplify the analysis of the evolution of the velocity map, it is possible to be limited to a one-dimensional study, taking into account the projection P(z,t) of the velocity map onto the z axis of propagation of the laser. This projection can be carried out digitally from the 2D image of the map of velocities measured on a VMI. Alternatively, the projection can be measured directly with a dedicated detector.

The projections obtained P(z,t) oscillate as a function of the polarization ellipticity of the laser and time. In order to determine the contribution of the different species, the projection is made symmetric as follows: $P^{sym}(z,t)=(P(z,t)+P(-z,t))/2$. A Fourier analysis of the evolution of each point z is carried out in order to obtain $P^{sym}(z,\Omega)$, where $\Omega$ is the frequency of the oscillation. According to the response of the molecular species under consideration to the polarization ellipticity, the Fourier transform presents different peaks at the frequencies $\Omega_1$, $\Omega_2$, etc. A base comprising the complex values of the spatially resolved Fourier transform is established: $P^{sym}(z, \Omega_1)$, $P^{sym}(z, \Omega_2)$, etc.

Figure 6A:
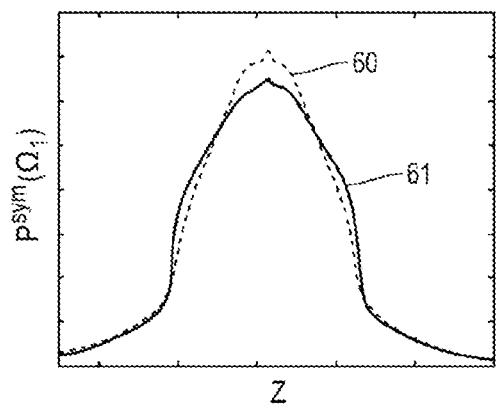
FIGS. 6A to 6D are diagrammatic representations of non-limitative examples of analysis of a sample of mixtures of multi-species chiral molecules with the present invention.

FIG. 6A presents a symmetric projection example $P^{sym}(\Omega_1)$ onto the z axis for the camphor 60 and fenchone 61 compounds. These species have the same mass and very similar ionization potentials. FIG. 6A shows that the velocity distribution is different nevertheless.

This process is repeated for the different pure molecular species which will have to be identified in the unknown mixture. The mixture can comprise two or more compounds. A series $P_A^{sym}(z, \Omega_1)$, $P_A^{sym}(z, \Omega_2)$, and so on, $P_B^{sym}(z, \Omega_1)$, $P_B^{sym}(z, \Omega_2)$, and so on, etc., where A and B designate the species (for a mixture with two species A and B), is then obtained.

During a measurement of a velocity map of an unknown mixture, the symmetric projections $P_{mix}^{sym}(z, \Omega_1)$, $P_{mix}^{sym}(z, \Omega_2)$, etc., are obtained. A least squares algorithm (or another adjustment procedure) is then used in order to minimize the following function:

$$f=|P_{mix}^{sym}(z,\Omega_1)-a*P_A^{sym}(z,\Omega_1)-(1-a)*P_B^{sym}(z,\Omega_1)|^2+\alpha|P_{mix}^{sym}(z,\Omega_2)-a*P_A^{sym}(z,\Omega_2)-(1-a)*P_B^{sym}(z,\Omega_2)|^2+\ldots,$$

where $\alpha$ is chosen so as to balance the relative weight of the contributions of the different peaks of the Fourier spectrum.

This procedure makes it possible to determine the coefficient a, which gives the relative weight of the contributions of the different species to the detected signal. This weight makes it possible to deduce the partial pressures of the species if the different measurements on the single-species and multi-species samples are carried out at the same total pressure.

The measurement of the relative weights is usually carried out by mass spectrometry, in line with the detection of the electrons. However, this conventional technique considerably limits the acquisition duration and does not make it possible to distinguish between species with the same mass. The procedure described above makes it possible to distinguish between two species with the same mass, such as camphor and fenchone.

In order to know the enantiomeric excess of each species, once the relative weight of each species of the mixture has been determined, a procedure similar to the one described above for the symmetric part of the distribution of the velocities is applied to the antisymmetric part:

$$P^{antisym}(z,t)=(P(z,t)-P(-z,t))/2,$$

which presents Fourier peaks at the frequencies $\Omega'_1$, $\Omega'_2$, etc.

Figure 6B:
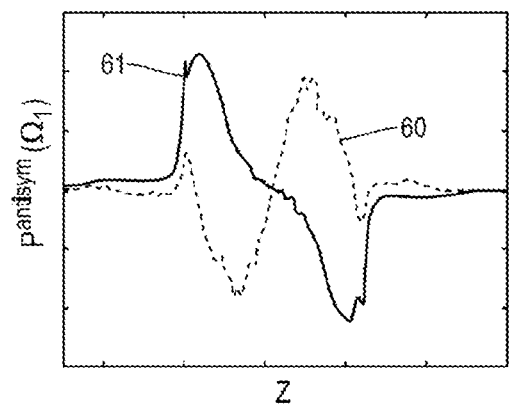

FIG. 6B presents an antisymmetric projection example $P^{antisym}(\Omega_1)$ onto the z axis for the camphor 60 and fenchone 61 compounds. The antisymmetric contribution of the distribution of the velocities is clearly different for the two species.

The following function is minimized:

$$g = |P_{mix}^{antisym}(z,\Omega'_1) - a*ee_A*P_A^{antisym}(z,\Omega'_1) - (1-a)*ee_B*P_B^{antisym}(z,\Omega'_1)|^2 + \alpha|P_{mix}^{antisym}(z,\Omega'_2) - a*ee_A*P_A^{antisym}(z,\Omega'_2) - (1-a)*ee_B*P_B^{antisym}(z,\Omega'_2)|^2 + \ldots,$$

similarly to the function f for the symmetric part.

The enantiomeric excess of each species, $ee_A$ and $ee_B$, is thus obtained.

The method described above for the analysis of a multi-species sample can also be associated with a Gabor analysis in order to carry out the real-time monitoring of the composition of a mixture, both from the point of view of the chemical species and from the point of view of their enantiomeric composition.

Figure 6C:
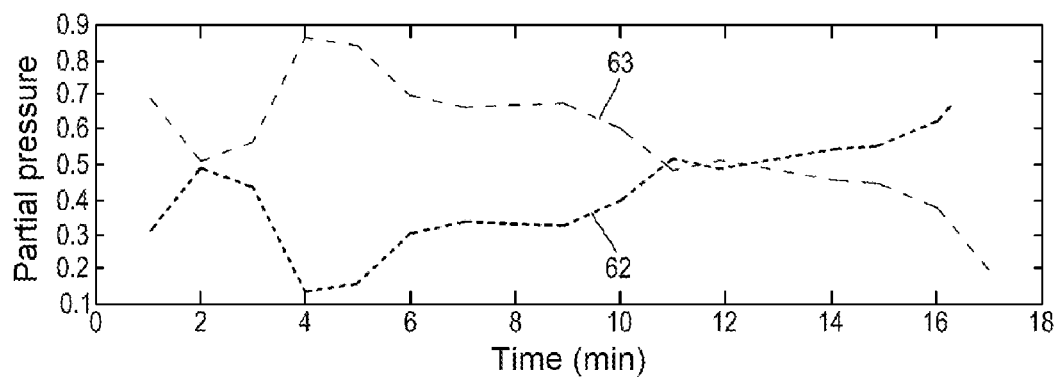

FIG. 6C represents the temporal evolution of the partial pressure of camphor 62 and fenchone 63 when flasks containing them are opened and closed, modifying their relative proportions.

Figure 6D:
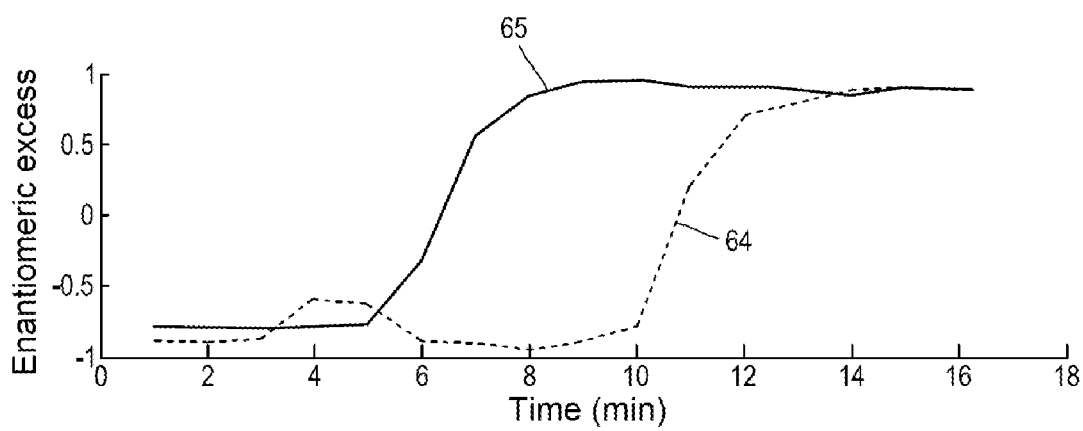

FIG. 6D represents the temporal evolution of the enantiomeric excess of camphor 64 and fenchone 65, respectively, when passing from a (−) sample to a (+) sample by opening and closing flasks containing them.

The projection of the velocity distribution onto the axis z aims to reduce the dimensionality of the problem and to reduce the processing of the data. However, the analysis of a multi-species sample can also be carried out using a two-dimensional map of the velocity distribution.

When, in addition to the modulation of the polarization, other parameters of the electromagnetic radiation are temporally modulated, for example the energy (or intensity), the wavelength or the duration of the laser pulses, the temporal evolution of the electron distribution is different from, or enhanced compared with, the one represented in FIG. 2B, where only the ellipticity of the polarization is modulated. In the Fourier spectrum of such an enhanced electron distribution, the number of components present is increased compared with a distribution where only the ellipticity of the polarization is modulated, as represented in FIG. 2C. This larger number of components then makes finer analyses of the enantiomeric excess possible, as well as the monitoring thereof in real time.

Of course, the invention is not limited to the examples that have just been described, and numerous modifications may be made to these examples without exceeding the scope of the invention.

The invention claimed is:

1. A method for measuring the chirality of molecules in a sample of chiral molecules, the sample comprising at least one chemical species, wherein the method comprises the following steps:
   introducing the sample of chiral molecules into an ionization area;
   ionizing the molecules by means of an electromagnetic radiation in the ionization area;
   detecting a distribution of electrons produced by the ionization and emitted to the front and to the back of the ionization area with respect to the axis, z, of propagation of the electromagnetic radiation;
   the electromagnetic radiation is elliptically polarized, wherein the polarization ellipticity of the radiation varies continuously and periodically as a function of time; and
   wherein the method includes a step of:
   determining the chirality of the molecules from the electron distribution detected continuously as a function of time.

2. The method according to claim 1, characterized in that the step of determining the chirality is performed in real time.

3. The method according to claim 1, characterized in that the detection step is carried out through measurements of the number of electrons, emitted to the front and to the back of the ionization area with respect to the axis, z, of propagation of the electromagnetic radiation, at times $t_i$ (i=1, 2, etc.), wherein the measured number is integrated during an interval $\Delta t = (t_i - t_{i-1})$ for each measurement.

4. The method according claim 1, characterized in that the step of determining the chirality of the molecules comprises a step of comparing a number of electrons detected at the front and a number of electrons detected at the back of the ionization area with respect to the axis, z, of propagation of the electromagnetic radiation.

5. The method according to claim 1, characterized in that it moreover comprises a step of Fourier analyzing a temporal evolution of the electron distribution in order to obtain the frequency spectrum of the distribution.

6. The method according to claim 5, characterized in that, for a sample of single-specie molecules, the method moreover comprises a step of determining an enantiomeric excess from the frequency spectrum of the electron distribution.

7. The method according to claim 1, characterized in that it moreover comprises a step of generating a spatial and/or angular distribution map P(x,t) of the emitted electrons from the distribution of the electrons as a function of time t, where x is the position of the electrons on the map.

8. The method according to claim 7, characterized in that it moreover comprises a step of Fourier analyzing each component of the distribution map.

9. The method according to claim 7, characterized in that it moreover comprises the following steps:
   determining the projection P(z,t) of the distribution map P(x,t) onto the axis, z, of propagation of the electromagnetic radiation; and
   Fourier analyzing the temporal evolution of the projection P(z,t) in order to obtain the frequency spectrum.

10. The method according to claim 9, characterized in that, for a sample of multi-species molecules, the method moreover comprises a step of determining the species of the sample from the frequency spectrum of the projection P(z,t) of the distribution map.

11. The method according to claim 9, characterized in that the method moreover comprises a step of determining the enantiomeric excess from the frequency spectrum of the projection P(z,t) of the distribution map of the electrons.

12. A system for measuring chirality, comprising:
   an ionization area arranged in order to receive a sample of chiral molecules comprising at least one chemical species;
   an electromagnetic radiation source arranged in order to emit an electromagnetic radiation and to ionize the chiral molecules in the ionization area by means of the electromagnetic radiation; and
   electron detection means arranged in order to detect a distribution of electrons produced by the ionization and emitted to the front and to the back of the ionization area with respect to the axis, z, of propagation of the electromagnetic radiation;

a polarization modulator arranged in order to polarize the electromagnetic radiation elliptically and arranged in order to make the polarization ellipticity of the radiation vary continuously as a function of time; and a determination device arranged and/or programmed in order to determine the chirality of the molecules from the electron distribution detected continuously as a function of time.

13. The system according to claim 12, characterized in that the electron detection means comprise at least one of a magnetic field ejection asymmetry detector and a velocity map imaging spectrometer.

14. The system according to claim 12, characterized in that the electromagnetic radiation source is a laser source.

15. The system according to claim 14, characterized in that the laser source is a femtosecond pulsed laser source.

16. The system according to claim 15, characterized in that it moreover comprises a modulator for the duration of the pulses of the laser source.

17. The system according to claim 12, characterized in that it moreover comprises an ion detector arranged in order to detect the ionized molecules.

18. The system according to claim 17, characterized in that the ion detector is a mass spectrometer.

19. The system according to claim 12, characterized in that the polarization modulator comprises a quarter-wave plate arranged in order to be set in rotation about the axis, z, of propagation of the radiation.

20. The system according to claim 12, characterized in that it moreover comprises an intensity modulator for the electromagnetic radiation and/or a wavelength modulator for the electromagnetic radiation.

21. The system according to claim 12, characterized in that it is arranged in order to implement a method for measuring the chirality of molecules in a sample of chiral molecules, the sample comprising at least one chemical species, wherein the method comprises the following steps:

introducing the sample of chiral molecules into an ionization area;

ionizing the molecules by means of a electromagnetic radiation in the ionization area;

detecting a distribution of electrons produced by the ionization and emitted to the front and to the back of the ionization area with respect to the axis, z, of propagation of the electromagnetic radiation;

the electromagnetic radiation is elliptically polarized, wherein the polarization ellipticity of the radiation varies continuously and periodically as a function of time; and wherein the method includes a step of determining the chirality of the molecules from the electron distribution detected continuously as a function of time.

* * * * *